May 4, 1926.
E. WELEBA
STRAINER
Filed Oct. 24, 1924
1,583,377
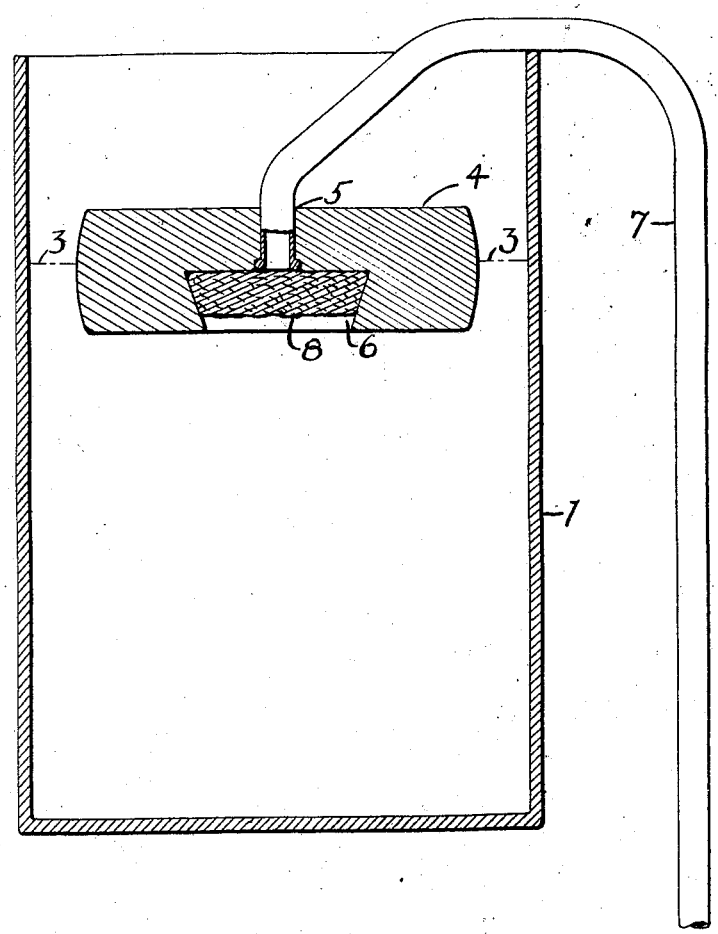
INVENTOR
EDWARD WELEBA,
by Arthur C Eckert ATTORNEY.

Patented May 4, 1926.

1,583,377

UNITED STATES PATENT OFFICE.

EDWARD WELEBA, OF FERGUSON, MISSOURI, ASSIGNOR OF TWENTY PER CENT TO AUGUST WIEGERS, OF ST. LOUIS, MISSOURI.

STRAINER.

Application filed October 24, 1924. Serial No. 745,538.

*To all whom it may concern:*

Be it known that EDWARD WELEBA, a citizen of the United States of America, residing at 250 Florissant Road, Ferguson, in the county of St. Louis and State of Missouri, has invented certain new and useful Improvements in Strainers, of which the following is a specification.

The object of my device is to make a strainer that is buoyant. That is to say, a strainer that is incorporated in a float, which float rises and falls with the liquid in which it is positioned. A further object is to make the strainer so that it may be used together with a hose or other connection to form a siphon. In the manufacture of many liquid products it is desirable to remove the liquid from one container to another and at the same time to strain the liquid, that is, to remove foreign substance held in suspension in the liquid. The strainer must be simple and effective, made of few and simple parts that lend themselves readily to multiple production, and it must be capable of being easily cleaned and the straining element removed for cleaning and replacement. My invention meets these requirements.

With these and other objects in view, my invention has relation to certain novel features of construction and arrangement of parts, as will be hereinafter more fully described, pointed out in the claims, and illustrated in the drawings, in which the single figure is a sectional elevation of a container partly filled with a liquid with my float and strainer, together with a hose secured thereto supported therein.

Numeral 1 designates the container which is partially filled with the liquid to the — line 3. Numeral 4 designates a float made of a material having a specific gravity less than one. The float may be conveniently made of wood or other substance that will float. The central hole 5 is formed in the float 4. In fluid communication with the central hole 5 is the inverted frusto-conical hole 6, which penetrates to the lower surface of the float 4. Numeral 7 designates a hose or other fluid conducting element which is secured in the central hole 5, as shown. Numeral 8 designates a straining element, such as a sponge. This element must be porous in order to permit the liquid to pass, but the porosity must be such as to prevent foreign substance in suspension from passing therethrough. It will be seen that in order for the liquid to pass through the hose 7 that it must pass through the porous element 8, and that as the surface of the liquid is lowered in the container that the float 4 will be lowered, thereby always immersing the lower end of the hole 6 in the liquid. Owing to this feature the siphon action will not be disturbed as the surface of the liquid varies and the upper liquid will be removed prior to the lower liquid. In other words, if a precipitate existed in the liquid near the bottom of the container, this precipitate would not pass through the strainer until all the liquid above it had been removed. The movement of the float is so gradual that the liquid is not agitated. By providing a hose 7 of sufficient length and positioned so that it may be pulled up and down with the float 4, and so that its lower external end may be lower than the lower surface of the float 4, a continuous siphon may be maintained until the liquid is drawn off to any predetermined desired level.

What I claim and mean to secure by Letters Patent is,

A filter comprising a float in the form of a block, having a recess dovetailed inwardly on one side of the float and also having a hole extending from said recess to the opposite side of said float and filtering material located in said recess and retained by the inclined sides of the recess.

In testimony whereof I affix my signature.

EDWARD WELEBA.